(12) United States Patent
Mou et al.

(10) Patent No.: US 12,485,376 B2
(45) Date of Patent: Dec. 2, 2025

(54) EXHAUST FAN FOR PREVENTING AIR POLLUTION

(71) Applicant: Microjet Technology Co., Ltd., Hsinchu (TW)

(72) Inventors: Hao-Jan Mou, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 758 days.

(21) Appl. No.: 17/846,622

(22) Filed: Jun. 22, 2022

(65) Prior Publication Data
US 2023/0233976 A1  Jul. 27, 2023

(30) Foreign Application Priority Data
Jan. 24, 2022  (TW) .................................. 111102956

(51) Int. Cl.
*B01D 46/46* (2006.01)
*A61L 9/013* (2006.01)
(Continued)

(52) U.S. Cl.
CPC .............. *B01D 46/46* (2013.01); *A61L 9/013* (2013.01); *A61L 9/014* (2013.01); *A61L 9/18* (2013.01); *A61L 9/22* (2013.01); *B01D 46/0028* (2013.01); *B01D 46/10* (2013.01); *B01D 46/429* (2013.01); *B01D 53/0454* (2013.01);
(Continued)

(58) Field of Classification Search
CPC ... A61L 9/18; A61L 9/22; A61L 9/014; A61L 2209/22; A61L 2209/14; A61L 2209/111; A61L 2101/06; B01D 46/0028; B01D 46/10; B01D 46/429; B01D 53/0454; B01D 2253/102; B01D 2253/108; B01D 2257/302; B01D 2257/404; B01D 2257/502; B01D 2257/504; B01D 2257/60; B01D 2257/708; B01D 2257/91; B01D 2273/30
See application file for complete search history.

(56) References Cited

U.S. PATENT DOCUMENTS

2020/0156084 A1* 5/2020 Mou ........................ B03C 3/32
2021/0188050 A1* 6/2021 Mou ................... B01D 39/2055
2022/0364748 A1* 11/2022 Mou ................... B01D 46/0043

FOREIGN PATENT DOCUMENTS

CN          1912482 A     2/2007
CN        111587347 A     8/2020
(Continued)

*Primary Examiner* — Lessanework Seifu
(74) *Attorney, Agent, or Firm* — Birch, Stewart, Kolasch & Birch, LLP

(57) ABSTRACT

An exhaust fan for preventing air pollution includes a main body and at least one gas detection module. The main body is configured to form an airflow-guiding path and includes a gas guider and a filtration and purification component disposed in the airflow-guiding path. The gas guider introduces an air convection for guiding an air pollution source contained in an air to pass through the filtration and purification component so as to filter and purify the air pollution source. The at least one gas detection module is disposed in the airflow-guiding path for detecting the air pollution source and transmitting gas detection data.

16 Claims, 20 Drawing Sheets

(51) Int. Cl.
    *A61L 9/014*    (2006.01)
    *A61L 9/18*     (2006.01)
    *A61L 9/22*     (2006.01)
    B01D 46/00  (2022.01)
    B01D 46/10  (2006.01)
    B01D 46/42  (2006.01)
    B01D 53/04  (2006.01)
    *A61L 101/06*   (2006.01)
(52) U.S. Cl.
    CPC ...... *A61L 2101/06* (2020.08); *A61L 2209/111* (2013.01); *A61L 2209/14* (2013.01); *A61L 2209/22* (2013.01); *B01D 2253/102* (2013.01); *B01D 2253/108* (2013.01); *B01D 2257/106* (2013.01); *B01D 2257/302* (2013.01); *B01D 2257/404* (2013.01); *B01D 2257/502* (2013.01); *B01D 2257/504* (2013.01); *B01D 2257/60* (2013.01); *B01D 2257/708* (2013.01); *B01D 2257/91* (2013.01); *B01D 2273/30* (2013.01); *B01D 2279/51* (2013.01); *B01D 2279/65* (2013.01)

(56) References Cited

FOREIGN PATENT DOCUMENTS

| | | |
|---|---|---|
| CN | 113952793 A | 1/2022 |
| JP | 2020-51647 A | 4/2020 |
| JP | 2021-105508 A | 7/2021 |
| KR | 20200031433 A | 3/2020 |
| TW | 202132728 A | 9/2021 |

* cited by examiner

EXHAUST FAN FOR PREVENTING AIR POLLUTION

FIELD OF THE INVENTION

The present disclosure relates to an exhaust fan for filtering and detecting an air pollution source, and more particularly to an exhaust fan for preventing air pollution.

BACKGROUND OF THE INVENTION

In recent years, people pay more and more attention to the air quality around our daily lives. Particulate matter (PM), such as $PM_1$, $PM_{2.5}$ and $PM_{10}$, carbon monoxide, carbon dioxide, total volatile organic compounds (TVOC), formaldehyde and even suspended particles, aerosols, bacteria and viruses contained in the air which are exposed in the environment might affect the human health and even endanger people's life seriously.

However, it is not easy to control the indoor air quality. Except for the air quality of the outdoor space, the air environmental conditions and air pollution sources in the indoor space, especially the dusts, bacteria and viruses in the indoor space originated from poor air circulation, are also the major factors that affect indoor air quality.

Therefore, it is a main subject developed in the present disclosure to provide a solution for purifying the indoor air quality to reduce the risks of breathing hazardous gases in the indoor space and monitoring the indoor air quality in real time, anytime and anywhere, thereby purifying the air in the indoor space and improving the indoor air quality rapidly.

SUMMARY OF THE INVENTION

One object of the present disclosure is to provide an exhaust fan for preventing air pollution. The exhaust fan for preventing air pollution detects the indoor air quality through a gas detection module so as to reveal the status of the air quality in the surrounding environment in real time, and guides an air pollution source to be filtered by a filtration and purification component through a gas guider in real time. Furthermore, the exhaust fan for preventing air pollution utilizes a microcontroller for receiving gas detection data detected by the gas detection module so as to control an enablement of the gas guider and adjust a volume of guiding air-flow of the gas guider. Accordingly, the air quality in the environment can be detected and the air pollution source can be filtered and processed in real time.

In accordance with an aspect of the present disclosure, an exhaust fan for preventing air pollution is provided and includes a main body and at least one gas detection module. The main body is configured to form an airflow-guiding path, and a gas guider and a filtration and purification component are disposed in the airflow-guiding path. The gas guider introduces an air convection for guiding an air pollution source contained in an air to pass through the filtration and purification component, so as to filter and purify the air pollution source. The at least one gas detection module is disposed in the airflow-guiding path for detecting the air pollution source and transmitting gas detection data.

In accordance with another aspect of the present disclosure, an exhaust fan for preventing air pollution is provided and includes a main body, at least one gas detection module and a microcontroller. The main body is configured to form an airflow-guiding path, and a gas guider and a filtration and purification component are disposed in the airflow-guiding path. The gas guider introduces an air convection for guiding an air pollution source contained in an air to pass through the filtration and purification component, so as to filter and purify the air pollution source. The at least one gas detection module is disposed in the airflow-guiding path for detecting the air pollution source and transmitting gas detection data. The microcontroller receives the gas detection data from the gas detection module through a wired or wireless communication transmission, and intelligently compares the gas detection data under a surveillance status, so as to issue a driving instruction for controlling an enablement of the gas guider and adjusting a volume of guiding air-flow of the gas guider.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
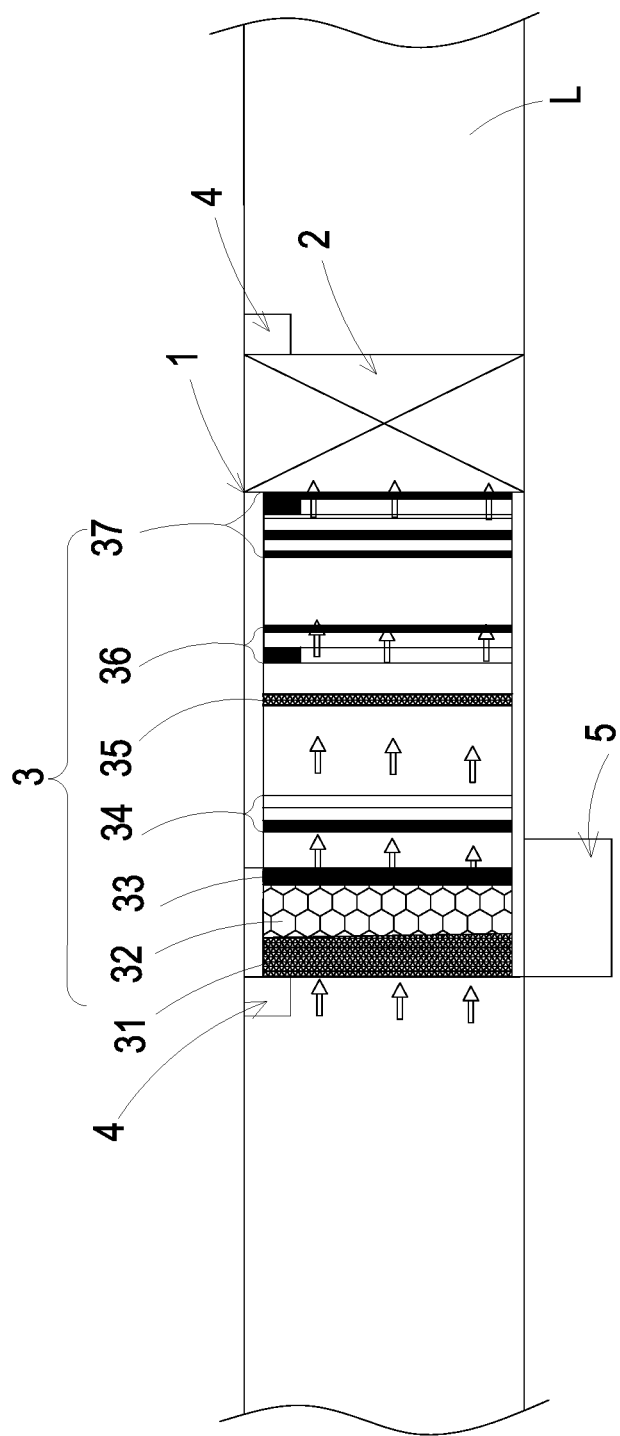
FIG. 1A is a schematic exterior view illustrating an exhaust fan for preventing air pollution according to an embodiment of the present disclosure.
Figure 1B:
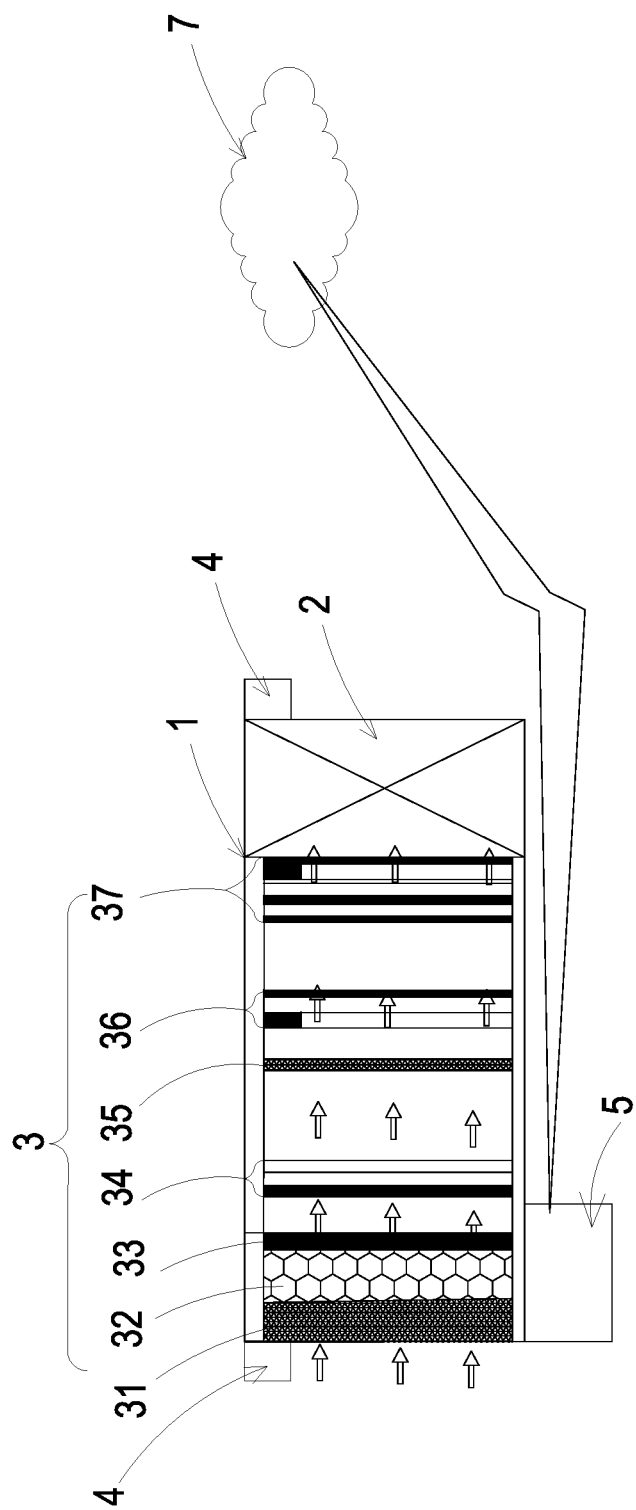
FIG. 1B is a schematic view illustrating the exhaust fan for preventing air pollution connected with a cloud computing system according to the embodiment of the present disclosure.

Please refer to FIGS. 1A and 1B. The present disclosure provides an exhaust fan for preventing air pollution including a main body 1, a gas guider 2, a filtration and purification component 3, at least one gas detection module 4 and a microcontroller 5. The main body 1 is configured to form an airflow-guiding path L, and the gas guider 2 and the filtration and purification component 3 are disposed in the airflow-guiding path L. The gas guider 2 is used to introduce an air convection for guiding an air pollution source contained in the air to pass through the filtration and purification component 3 so as to filter and purify the air pollution source. The at least one gas detection module 4 is disposed in the airflow-guiding path L of the main body 1 for detecting the air pollution source and transmitting gas detection data. The microcontroller 5 receives the gas detection data from the gas detection module 4 through a wireless communication transmission, and intelligently compares the gas detection data under a surveillance status, so as to issue a driving instruction for controlling an enablement of the gas guider 2 and adjusting a volume of guiding air-flow of the gas guider 2. The surveillance status is referring to that the air pollution source is continuously monitored to make sure that the gas detection data does not exceed a safety detection value.

Preferably but not exclusively, the gas guider 2 can be an armature-type gas guider 2 or a centrifugal gas guider 2, but not limited thereto, and any gas guider 2 capable of generating airflow and fluid flow can be an extension example of this embodiment of the present disclosure. Notably, in an embodiment, the filtration and purification component 3 is arranged between two gas detection modules 4. Furthermore, in an embodiment, after the microcontroller 5 receives the gas detection data detected by the gas detection module 4 through the wireless communication transmission, the microcontroller 5 performs an intelligent judgment and issues a driving instruction to control the enablement of the gas guider 2 or adjust the volume of guiding air-flow thereof. That is, the more the gas detection data exceeds the safety detection value, the more the air-flow volume of the gas guider 2 is increased, and the less the gas detection data exceeds the safety detection value, the less the air-flow volume of the gas guider 2 is increased.

Please refer to FIG. 3 to FIG. 9A. In the embodiment, the gas detection module 4 includes a control circuit board 41, a gas detection main part 42, a microprocessor 43 and a communicator 44. The gas detection main part 42, the microprocessor 43 and the communicator 44 are integrally packaged on the control circuit board 41 and electrically connected with each other. The microprocessor 43 controls a driving signal of the gas detection main part 42 to enable the detection. The gas detection main part 42 detects the air pollution source and outputs a detection signal. The microprocessor 43 receives the detection signal for calculating, processing and outputting, so that the microprocessor 43 of the gas detection module 4 generates the gas detection data which is provided to the communicator 44 for an external communication transmission. The above-mentioned external communication transmission of the communicator 44 can be a wired bidirectional communication, such as USB, mini-USB, micro-USB etc., or a wireless bidirectional communication, such as a Wi-Fi module, a Bluetooth module, a radio frequency identification module, a near field communication (NFC) module etc., but not limited thereto. Preferably but not exclusively, the microcontroller 5 receives the gas detection data transmitted by the communicator 44 through the wireless communication transmission.

The gas detection main part 42 mentioned above includes a base 421, a piezoelectric actuator 422, a driving circuit board 423, a laser component 424, a particulate sensor 425, an outer cover 426 and a gas sensor 427. In the embodiment, the base 421 includes a first surface 4211, a second surface 4212, a laser loading region 4213, a gas-inlet groove 4214, a gas-guiding-component loading region 4215 and a gas-outlet groove 4216. The first surface 4211 and the second surface 4212 are two surfaces opposite to each other. In the embodiment, the laser loading region 4213 is hollowed out from the first surface 4211 toward the second surface 4212, so as to accommodate the laser component 424. The outer cover 426 covers the base 421 and includes a side plate 4261. The side plate 4261 has an inlet opening 4261a and an outlet opening 4261b. The gas-inlet groove 4214 is concavely formed from the second surface 4212 and disposed adjacent to the laser loading region 4213. The gas-inlet groove 4214 includes a gas-inlet 4214a and two lateral walls. The gas-inlet 4214a is in communication with an environment outside the base 421, and is spatially corresponding in position to the inlet opening 4261a of the outer cover 426. The gas-inlet 4214a includes two transparent windows 4214b opened on two lateral walls of the gas-inlet groove 4214 and are in communication with the laser loading region 4213. Therefore, when the first surface 4211 of the base 421 is covered and attached by the outer cover 426, and the second surface 4212 is covered and attached by the driving circuit board 423, an inlet path is defined by the gas-inlet groove.

In the embodiment, the gas-guiding-component loading region 4215 mentioned above is concavely formed from the second surface 4212 and in communication with the gas-inlet groove 4214. A ventilation hole 4215a penetrates a bottom surface of the gas-guiding-component loading region 4215. The gas-guiding-component loading region 4215 includes four positioning protrusions 4215b disposed at four corners of the gas-guiding-component loading region 4215, respectively. In the embodiment, the gas-outlet groove 4216 includes a gas-outlet 4216a, and the gas-outlet 4216a is spatially corresponding to the outlet opening 4261b of the outer cover 426. The gas-outlet groove 4216 includes a first section 4216b and a second section 4216c. The first section 4216b is concavely formed out from the first surface 4211 in a region spatially corresponding to a vertical projection area of the gas-guiding-component loading region 4215. The second section 4216c is hollowed out from the first surface 4211 to the second surface 4212 in a region where the first surface 4211 is extended from the vertical projection area of the gas-guiding-component loading region 4215. The first section 4216b and the second section 4216c are connected to form a stepped structure. Moreover, the first section 4216b of the gas-outlet groove 4216 is in communication with the ventilation hole 4215a of the gas-guiding-component loading region 4215, and the second section 4216c of the gas-outlet groove 4216 is in communication with the gas-outlet 4216a. In that, when first surface 4211 of the base 421 is attached to and covered by the outer cover 426 and the second surface 4212 of the base 421 is attached and covered by the driving circuit board 423, the gas-outlet groove 4216 and the driving circuit board 423 collaboratively define an outlet path.

Moreover, the laser component 424 and the particulate sensor 425 mentioned above are disposed on and electrically connected to the driving circuit board 423 and located within the base 421. In order to clearly describe and illustrate the positions of the laser component 424 and the particulate sensor 425 in the base 421, the driving circuit board 423 is intentionally omitted. The laser component 424 is accommodated in the laser loading region 4213 of the base 421, and the particulate sensor 425 is accommodated in the gas-inlet groove 4214 of the base 421 and is aligned to the laser component 424. In addition, the laser component 424 is spatially corresponding to the transparent window 4214b, so that a light beam emitted by the laser component 424 passes through the transparent window 4214b and irradiates into the gas-inlet groove 4214. A light beam path from the laser component 424 passes through the transparent window 4214b and extends in an orthogonal direction perpendicular to the gas-inlet groove 4214. In the embodiment, the projecting light beam emitted from the laser component 424 passes through the transparent window 4214b and enters the gas-inlet groove 4214 to irradiate the suspended particles contained in the gas passing through the gas-inlet groove 4214. When the suspended particles contained in the gas are irradiated and generate scattered light spots, the scattered light spots are detected and calculated by the particulate sensor 425, which is in an orthogonal direction perpendicular to the gas-inlet groove 4214, to obtain the gas detection data. Preferably but not exclusively, in some embodiments, the particulate sensor 425 is used for detecting the gas information of suspended particulates in the air pollution source. In the embodiment, the gas sensor 427 is positioned and disposed on the driving circuit board 423, electrically connected to the driving circuit board 423, and accommodated in the gas-outlet groove 4216, so as to detect the air pollution source introduced into the gas-outlet groove 4216.

Preferably but not exclusively, in some embodiments, the gas sensor 427 includes a volatile-organic-compound sensor for detecting the gas information of carbon dioxide ($CO_2$) or volatile organic compounds (TVOC). In some other embodiments, the gas sensor 427 includes a formaldehyde sensor for detecting the information of formaldehyde in the gas. In some other embodiments, the gas sensor 427 includes a bacteria sensor for detecting the information of bacteria and fungi in the gas. In some other embodiments, the gas sensor 427 includes a virus sensor for detecting the information of viruses in the gas. In some other embodiments, the gas sensor 427 includes a temperature and humidity sensor for detecting the information of temperature and humidity of the gas.

In the embodiment, the piezoelectric actuator 422 mentioned above is accommodated in the square-shaped gas-guiding-component loading region 4215 of the base 421, and the gas-guiding-component loading region 4215 of the base 421 is in communication with the gas-inlet groove 4214. When the piezoelectric actuator 422 is enabled, the gas in the gas-inlet 4214 is inhaled into the piezoelectric actuator 422, and flows through the ventilation hole 4215a of the gas-guiding-component loading region 4215 into the gas-outlet groove 4216. Moreover, the driving circuit board 423 mentioned above is attached and covered by the second surface 4212 of the base 421, and the laser component 424 is positioned and disposed on the driving circuit board 423 and is electrically connected to the driving circuit board 423. The particulate sensor 425 is also positioned and disposed on the driving circuit board 423 and electrically connected to the driving circuit board 423. In that, when the outer cover 426 covers the base 421, the inlet opening 4261a is spatially corresponding to the gas-inlet 4214a of the base 421, and the outlet opening 4261b is spatially corresponding to the gas-outlet 4216a of the base 421.

The piezoelectric actuator 422 mentioned above includes a gas-injection plate 4221, a chamber frame 4222, an actuator element 4223, an insulation frame 4224 and a conductive frame 4225. In the embodiment, the gas-injection plate 4221 is made by a flexible material and includes a suspension plate 4221a and a hollow aperture 4221b. The suspension plate 4221a is a sheet structure and is permitted to undergo a bending deformation. Preferably but not exclusively, the shape and the size of the suspension plate 4221a are in corresponding to the inner edge of the gas-guiding-component loading region 4215, but not limited thereto. The hollow aperture 4221b passes through a center of the suspension plate 4221a, so as to allow the gas to flow therethrough. Preferably but not exclusively, in the embodiment, the shape of the suspension plate 4221a is selected from the group consisting of a square, a circle, an ellipse, a triangle and a polygon, but not limited thereto.

Moreover, the chamber frame 4222 mentioned above is carried and stacked on the gas-injection plate 4221, and the shape of the chamber frame 4222 is in corresponding to the gas-injection plate 4221. The actuator element 4223 is carried and stacked on the chamber frame 4222 so as to collaboratively define a resonance chamber 4226 with the gas-injection plate 4221 and the suspension plate 2221a. The insulation frame 4224 is carried and stacked on the actuator element 4223 and the appearance of the insulation frame 4224 is similar to that of the chamber frame 4222. The conductive frame 4225 is carried and stacked on the insulation frame 4224, and the appearance of the conductive frame 4225 is similar to that of the insulation frame 4224. In addition, the conductive frame 4225 includes a conducting pin 4225a and a conducting electrode 4225b. The conducting pin 4225a is extended outwardly from an outer edge of the conductive frame 4225, and the conducting electrode 4225b is extended inwardly from an inner edge of the conductive frame 4225.

Moreover, the actuator element 4223 further includes a piezoelectric carrying plate 4223a, an adjusting resonance plate 4223b and a piezoelectric plate 4223c. The piezoelectric carrying plate 4223a is carried and stacked on the chamber frame 4222. The adjusting resonance plate 4223b is carried and stacked on the piezoelectric carrying plate 4223a. The piezoelectric plate 4223c is carried and stacked on the adjusting resonance plate 4223b. The adjusting resonance plate 4223b and the piezoelectric plate 4223c are accommodated in the insulation frame 4224. The conducting electrode 4225b of the conductive frame 4225 is electrically connected to the piezoelectric plate 4223c. In the embodiment, the piezoelectric carrying plate 4223a and the adjusting resonance plate 4223b are made by a conductive material. The piezoelectric carrying plate 4223a includes a piezoelectric pin 4223d. The piezoelectric pin 4223d and the conducting pin 4225a are electrically connected to a driving circuit (not shown) of the driving circuit board 423, so as to receive the driving signal, such as a driving frequency and a driving voltage. Through this structure, a circuit is formed by the piezoelectric pin 4223d, the piezoelectric carrying plate 4223a, the adjusting resonance plate 4223b, the piezoelectric plate 4223c, the conducting electrode 4225b, the conductive frame 4225 and the conducting pin 4225a for transmitting the driving signal. Moreover, the insulation frame 4224 provides insulation between the conductive frame 4225 and the actuator element 4223, so as to avoid the occurrence of a short circuit. Thereby, the driving signal is transmitted to the piezoelectric plate 4223c. After receiving the driving signal, the piezoelectric plate 4223c deforms due to the piezoelectric effect, and the piezoelectric carrying plate 4223a and the adjusting resonance plate 4223b are further driven to generate the bending deformation in the reciprocating manner.

Furthermore, the adjusting resonance plate 4223b is located between the piezoelectric plate 4223c and the piezoelectric carrying plate 4223a and served as a cushion between the piezoelectric plate 4223c and the piezoelectric carrying plate 4223a. Thereby, the vibration frequency of the piezoelectric carrying plate 4223a is adjustable. Basically, the thickness of the adjusting resonance plate 4223b is greater than the thickness of the piezoelectric carrying plate 4223a, and the vibration frequency of the actuator element 4223 can be adjusted by adjusting the thickness of the adjusting resonance plate 4223b. In the embodiment, the gas-injection plate 4221, the chamber frame 4222, the actuator element 4223, the insulation frame 4224 and the conductive frame 4225 are stacked and positioned in the gas-guiding-component loading region 4215 sequentially, so that the piezoelectric actuator 422 is supported and positioned in the gas-guiding-component loading region 4215. A plurality of clearances 4221c are defined between the suspension plate 4221a of the gas-injection plate 4221 and an inner edge of the gas-guiding-component loading region 4215 for gas to flow therethrough.

A flowing chamber 4227 is formed between the gas-injection plate 4221 and the bottom surface of the gas-guiding-component loading region 4215. The flowing chamber 4227 is in communication with the resonance chamber 4226 between the actuator element 4223, the chamber frame 4222 and the suspension plate 4221a, through the hollow aperture 4221b of the gas-injection plate 4221. By controlling the vibration frequency of the gas in the resonance chamber 4226 to be close to the vibration frequency of the suspension plate 4221a, the Helmholtz resonance effect is generated between the resonance chamber 4226 and the suspension plate 4221a, so as to improve the efficiency of gas transportation. When the piezoelectric plate 4223c is moved away from the bottom surface of the gas-guiding-component loading region 4215, the suspension plate 4221a of the gas-injection plate 4221 is driven to move away from the bottom surface of the gas-guiding-component loading region 4215 by the piezoelectric plate 4223c. In that, the volume of the flowing chamber 4227 is expanded rapidly, the internal pressure of the flowing chamber 4227 is decreased to form a negative pressure, and the gas outside the piezoelectric actuator 422 is inhaled through the clearances 4221c and enters the resonance chamber 4226 through the hollow aperture 4221b. Consequently, the pressure in the resonance chamber 4226 is increased to generate a pressure gradient. When the suspension plate 4221a of the gas-injection plate 4221 is driven by the piezoelectric plate 4223c to move toward the bottom surface of the gas-guiding-component loading region 4215, the gas in the resonance chamber 4226 is discharged out rapidly through the hollow aperture 4221b, and the gas in the flowing chamber 4227 is compressed, thereby the converged gas is quickly and massively ejected out of the flowing chamber 4227 under the condition close to an ideal gas state of the Benulli's law, and transported to the ventilation hole 4215a of the gas-guiding-component loading region 4215.

Figure 9A:
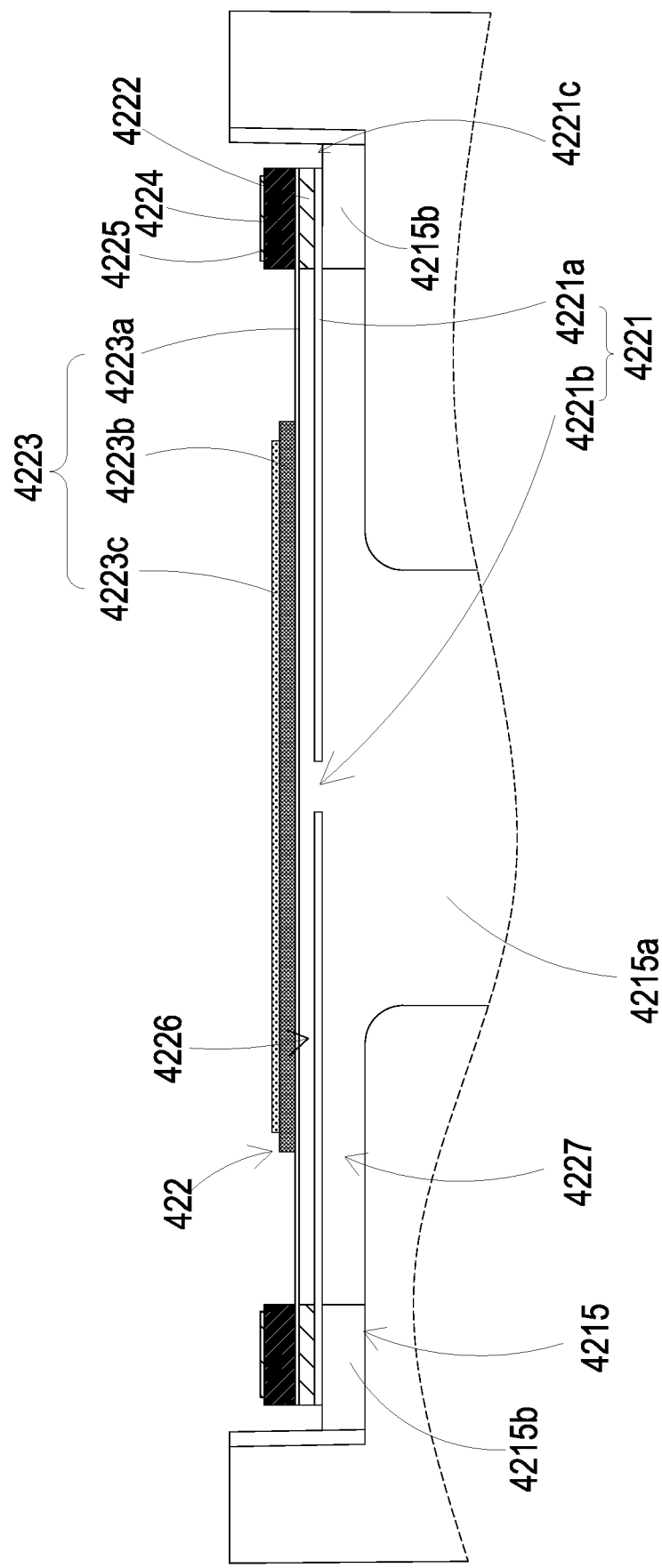
FIG. 9A is a schematic cross-sectional view illustrating the piezoelectric actuator of the gas detection main part in the gas detection module according to an embodiment of the present disclosure.
Figure 9B:
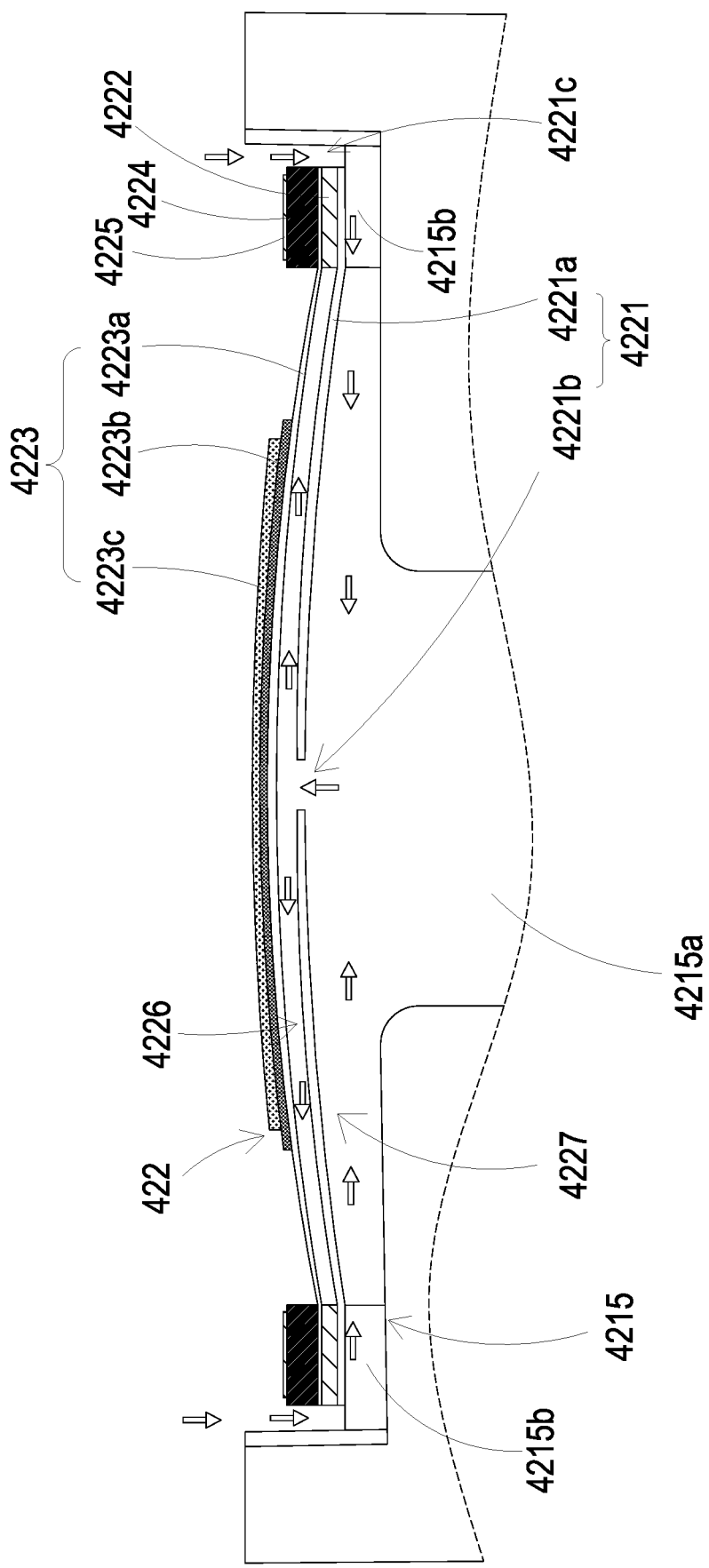
FIG. 9B is a schematic cross-sectional view illustrating a first operation step of the piezoelectric actuator in the gas detection main part of the gas detection module according to the embodiment of the present disclosure.
Figure 9C:
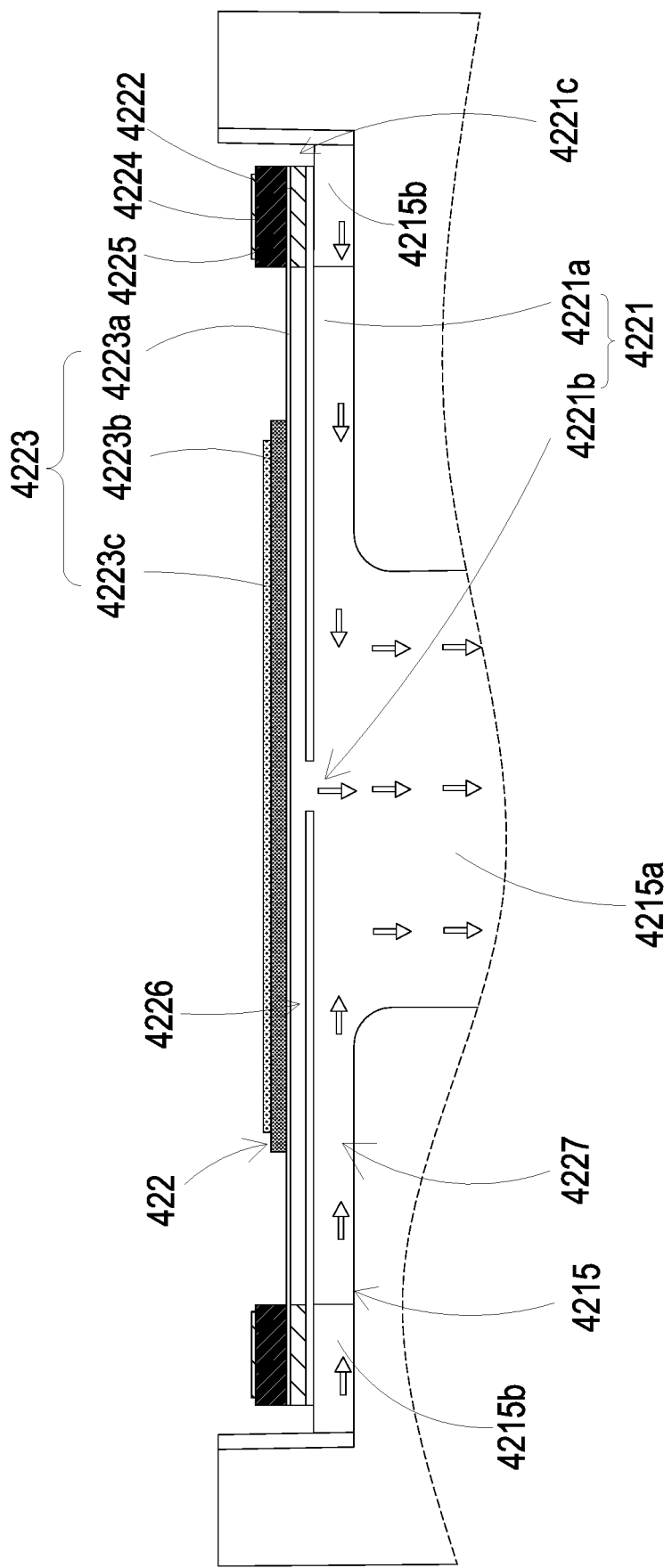
FIG. 9C is a schematic cross-sectional view illustrating a second operation step of the piezoelectric actuator in the gas detection main part of the gas detection module according to the embodiment of the present disclosure.

By repeating the above operation steps shown in FIG. 9B and FIG. 9C, the piezoelectric plate 4223c is driven to generate the bending deformation in a reciprocating manner According to the principle of inertia, since the gas pressure inside the resonance chamber 4226 is lower than the equilibrium gas pressure after the converged gas is ejected out, the gas is introduced into the resonance chamber 4226 again. Moreover, the vibration frequency of the gas in the resonance chamber 4226 is controlled to be close to the vibration frequency of the piezoelectric plate 4223c, so as to generate the Helmholtz resonance effect to achieve the gas transportation at high speed and in large quantities.

Figure 10A:
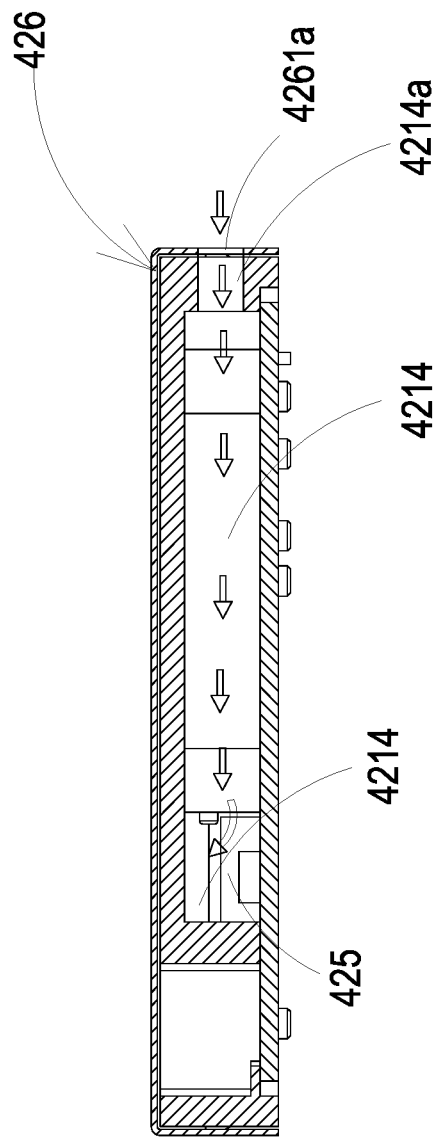
FIG. 10A is a schematic cross-sectional view illustrating an introduction of gas in the gas detection main part of the gas detection module according to an embodiment of the present disclosure.
Figure 10B:
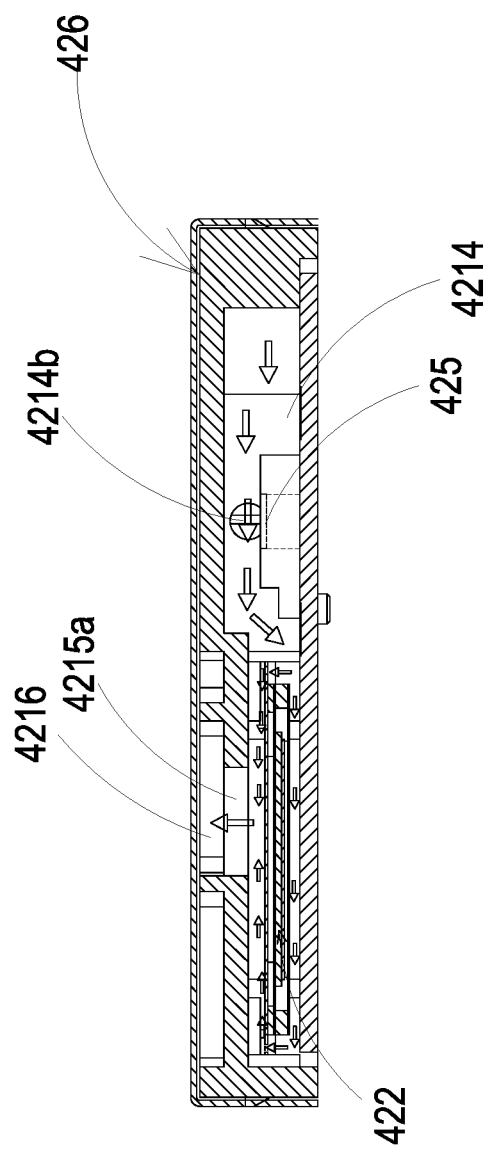
FIG. 10B is a schematic cross-sectional view illustrating an operation of gas detection in the gas detection main part of the gas detection module according to the embodiment of the present disclosure.
Figure 10C:
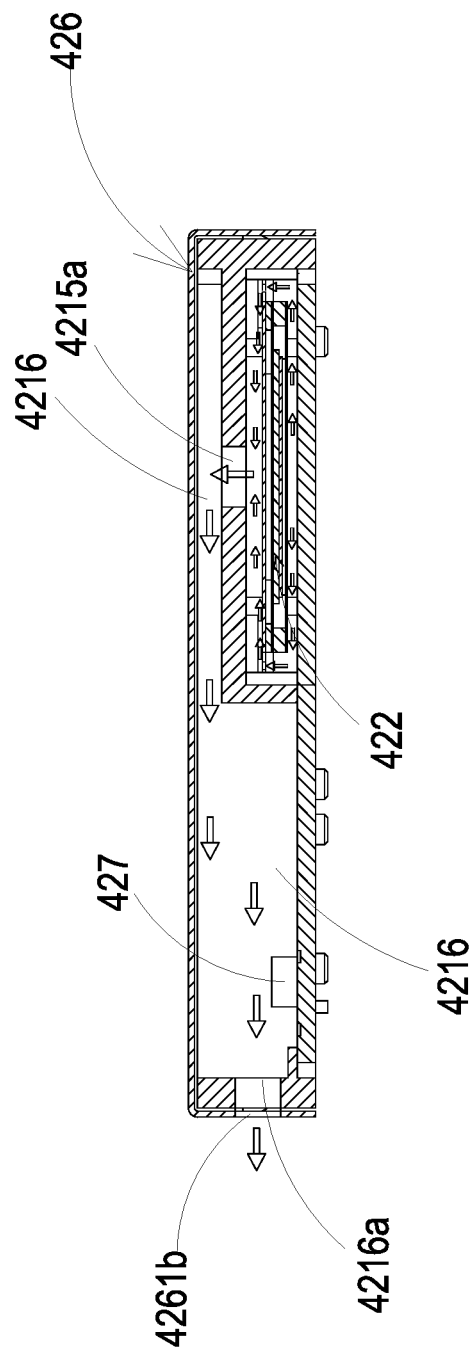
FIG. 10C is a schematic cross-sectional view illustrating of a discharging of gas in gas detection main part of the gas detection module according to the embodiment of the present disclosure.

Please refer to FIG. 10A to FIG. 10C. The gas is inhaled through the inlet opening 4261a of the outer cover 426, flows into the gas-inlet groove 4214 of the base 421 through the gas-inlet 4214a, and is transported to the position of the particulate sensor 425. The piezoelectric actuator 422 is enabled continuously to inhale the gas into the inlet path, and facilitate the gas outside the gas detection module to be introduced rapidly and flow stably, and transported above the particulate sensor 425. At this time, a projecting light beam emitted from the laser component 424 passes through the transparent window 4214b to irritate the suspended particles contained in the gas flowing above the particulate sensor 425 in the gas-inlet groove 4214. When the suspended particles contained in the gas are irradiated and generate scattered light spots, the scattered light spots are detected and calculated by the particulate sensor 425 for obtaining related information about the sizes and the concentration of the suspended particles contained in the gas. Moreover, the gas above the particulate sensor 425 is continuously driven and transported by the piezoelectric actuator 422, flows through the ventilation hole 4215a of the gas-guiding-component loading region 4215, and is transported to the gas-outlet groove 4216. At last, after the gas flows into the gas outlet groove 4216, the gas is continuously transported into the gas-outlet groove 4216 by the piezoelectric actuator 422, and thus, the gas in the gas-outlet groove 4216 is pushed to discharge through the gas-outlet 4216a and the outlet opening 4261b.

Please refer to FIG. 1A and FIG. 1B. The above-mentioned filtration and purification component 3 can be a combination of various implementations. In some embodiments, the filtration and purification component 3 is an activated carbon filter screen 31. In some embodiments, the filtration and purification component 3 is a high efficiency particulate air (HEPA) filter screen 32. In some other embodiments, the filtration and purification component 3 includes an activated carbon filter screen 31, a HEPA filter screen 32 and a zeolite filter screen 33. In some embodiments, the activated carbon filter screen 31 or the HEPA filter screen 32 is coated with a layer of a cleansing factor containing chlorine dioxide, so as to inhibit viruses, bacteria, fungi, influenza A, influenza B, enterovirus and norovirus in the air pollution source introduced into the filtration and purification component 3, and the inhibition ratio can reach 99% and more, thereby reducing the cross-infection of viruses. In some embodiments, the activated carbon filter screen 31 or the HEPA filter screen 32 is coated with an herbal protective layer extracted from ginkgo and Japanese *Rhus chinensis* to form an herbal protective anti-allergic filter, so as to resist allergy effectively and destroy a surface protein of influenza virus (such as H1N1 influenza virus) passing therethrough. In some embodiments, the activated carbon filter screen 31 or the HEPA filter screen 32 is coated with a layer of silver ions, so as to inhibit viruses, bacteria and fungi contained in the air pollution source.

The activated carbon filter screen 31 is configured to filter and absorb the particulate matter 2.5 ($PM_{2.5}$), the zeolite filter screen 33 is configured to filter and absorb the volatile organic compounds (VOCs), and the HEPA filter screen 32 is configured to absorb the chemical smoke, the bacteria, the dust particles and the pollen contained in the gas, so as to achieve the effects of filtering and purifying the air pollution source introduced into the filtration and purification component 3.

In an embodiment, the filtration and purification component 3 includes the combination of an activated carbon filter screen 31, a HEPA filter screen 32 and a zeolite filter screen 33 with a phot-catalyst unit 34. In that, when the air pollution source from the outdoor space B is introduced into the filtration and purification component 3, the light energy is converted into the chemical energy by the photo-catalyst unit 34, thereby decomposing harmful gases in the air pollution source and disinfecting bacteria contained therein, so as to achieve the effects of filtering and purifying.

In an embodiment, the filtration and purification component 3 includes the combination of an activated carbon filter screen 31, a HEPA filter screen 32 and a zeolite filter screen 33 with a photo-plasma unit 35. The photo-plasma unit 35 includes a nanometer irradiation tube. The air pollution source introduced into the filtration and purification component 3 is irradiated by the nanometer irradiation tube to decompose volatile organic compounds contained in air pollution source and purify thereof. When the air pollution source is introduced by the filtration and purification component 3, the introduced gas is irradiated by the nanometer irradiation tube, and thus, oxygen molecules and water molecules contained in the air pollution source are decomposed into high oxidizing photo-plasma to generate an ion flow capable of destroying organic molecules. In that, volatile formaldehyde, volatile toluene and volatile organic compounds (VOC) contained in the air pollution source are decomposed into water and carbon dioxide, so as to achieve the effects of filtering and purifying.

In an embodiment, the filtration and purification component 3 includes the combination of an activated carbon filter screen 31, a HEPA filter screen 32 and a zeolite filter screen 33 with a negative ionizer 36. Preferably but not exclusively, the negative ionizer 36 includes a dust collecting plate. When the air pollution source from the outdoor space B is introduced into the filtration and purification component 3, a high voltage discharge makes the suspended particles in the gas to carry with positive charges and adhere to the dust collecting plate carrying with negative charges, so as to achieve the effects of filtering and purifying the air pollution source introduced.

In an embodiment, the filtration and purification component 3 includes the combination of an activated carbon filter screen 31, a HEPA filter screen 32 and a zeolite filter screen 33 with a plasma ion unit 37. A high-voltage plasma column with plasma ion is formed by the plasma ion unit 37, so as to decompose viruses and bacteria contained in the air pollution source from the outdoor space B introduced into the filtration and purification component 3. Through the plasma ion, oxygen molecules and water molecules contained in the air pollution source are decomposed into positive hydrogen ions ($H^+$) and negative oxygen ions ($O_2^-$). The substances attached with water around the ions are adhered on the surface of viruses and bacteria and converted into OH radicals with extremely strong oxidizing power, thereby removing hydrogen (H) from the protein on the surface of viruses and bacteria, and thus decomposing (oxidizing) the protein, so as to filter the introduced gas and achieve the effects of filtering and purifying.

In some embodiments, the filtration and purification component 3 may merely include the HEPA filter screen 32. In some embodiments, the filtration and purification component 3 includes the HEPA filter screen 32 combined with any one of the phot-catalyst unit 34, the photo-plasma unit 35, the negative ionizer 36 and the plasma ion unit 37. In some embodiments, the filtration and purification component 3 includes the HEPA filter screen 32 combined with any two of the phot-catalyst unit 34, the photo-plasma unit 35, the negative ionizer 36 and the plasma ion unit 37. In some embodiments, the filtration and purification component 3 includes the HEPA filter screen 32 combined with any three of the phot-catalyst unit 34, the photo-plasma unit 35, the negative ionizer 36 and the plasma ion unit 37. Alternatively, the filtration and purification component 3 includes the HEPA filter screen 32 combined with the phot-catalyst unit 34, the photo-plasma unit 35, the negative ionizer 36 and the plasma ion unit 37.

In brief, in some embodiments, the filtration and purification component 3 is one selected from the group consisting of the activated carbon filter screen 31, the HEPA filter screen 32, the zeolite filter screen 33, the photo-catalyst unit 34, the photo-plasma unit 35, the negative ionizer 36, the plasma ion unit 37 and a combination thereof.

In the embodiment, the air pollution source is one selected from the group consisting of particulate matter, carbon monoxide, carbon dioxide, ozone, sulfur dioxide, nitrogen dioxide, lead, total volatile organic compounds, formaldehyde, bacteria, fungi, virus and a combination thereof.

In the embodiment, the microcontroller 5 receives the gas detection data from the gas detection module 4 through the wireless communication transmission, and intelligently compares the gas detection data under the surveillance status. The surveillance status refers to that the air pollution source is continuously monitored to make sure that the gas detection data does not exceed the safety detection value. Preferably but not exclusively, the safety detection value includes at least one selected from the group consisting of less than 35 μg/m³ of the value of $PM_{2.5}$, less than 1000 ppm of the carbon dioxide content, less than 0.56 ppm of the total volatile organic compounds content, less than 0.08 ppm of the formaldehyde content, less than 1500 CFU/m³ of the amount of bacteria, less than 1000 CFU/m³ of the amount of fungi, less than 0.075 ppm of the sulfur dioxide content, less than 0.1 ppm of the nitrogen dioxide content, less than 9 ppm of the carbon monoxide content, less than 0.06 ppm of the ozone content, and less than 0.15 μg/m³ of the value of lead.

From the above description, the present disclosure provides an exhaust fan for preventing air pollution. Through detecting the indoor air quality in real time by the gas detection module 4, the status of the air quality in the surrounding environment can be revealed. Moreover, the air pollution source is guided through the gas guider 2, so as to be filtered in real time by the filtration and purification component 3. Furthermore, the microcontroller 5 is utilized to receive the data detected by the gas detection module 4 for controlling the enablement of the gas guider 2 and adjusting the volume of guiding air-flow of the gas guider 2. Accordingly, an automated detection mode of the exhaust fan for preventing air pollution can be achieved, and the air quality in the surrounding environment can be detected and the air pollution source can be filtered and processed in real time.

Furthermore, the present disclosure can be combined with a cloud system. Please refer to FIG. 1B. In some embodiments, the exhaust fan for preventing air pollution of the present disclosure is combined with a cloud computing system 7. The microcontroller 5 performs a bidirectional communication with the cloud computing system 7 through the wireless communication transmission, so as to transmit the gas detection data detected by the gas detection module 4 of the exhaust fan to the cloud computing system 7 and receive the information transmitted from the cloud computing system 7, thereby issuing the driving instruction to control the enablement of the gas guider 2 and adjust the volume of guiding air-flow of the gas guider 2.

Please further refer to FIG. 1B. In the embodiment, the exhaust fan for preventing air pollution performs a bidirectional communication with the cloud processing system 7 through the microcontroller 5 so as to transmit the gas detection data detected by the gas detection module 4 to the cloud processing system 7 and receive the information transmitted from the cloud processing system 7, thereby issuing the driving instruction to control the enablement of the gas guider 2 and adjust the volume of guiding air-flow of the gas guider 2. Notably, the enablement of the gas guider 2 or the adjustment of the volume of guiding air-flow can be controlled manually through the microcontroller 5 directly. Alternatively, the volume of guiding air-flow of the gas guider 2 also can be intelligently and automatically adjusted by the cloud computing system 7 through issuing the driving instruction to the gas guider 2. That is, the more the gas detection data exceeds the safety detection value, the more the air-flow volume of the gas guider 2 is adjusted to be increased, and the less the gas detection data exceeds the safety detection value, the less the air-flow volume of the gas guider 2 is adjusted to be increased. In addition, notably, if there are a plurality of exhaust fans disposed in the indoor space in different locations, in accordance with the different gas detection data detected by the gas detection modules 4 of the plurality of exhaust fans, the cloud computing system 7 can transmit respective control signals to the corresponding exhaust fans based on different air quality conditions in different locations, thereby the enablement of each gas guider 2 and the adjustment of the volume of guiding air-flow of each the exhaust fan can be controlled by the respective microcontroller 5.

Figure 2:
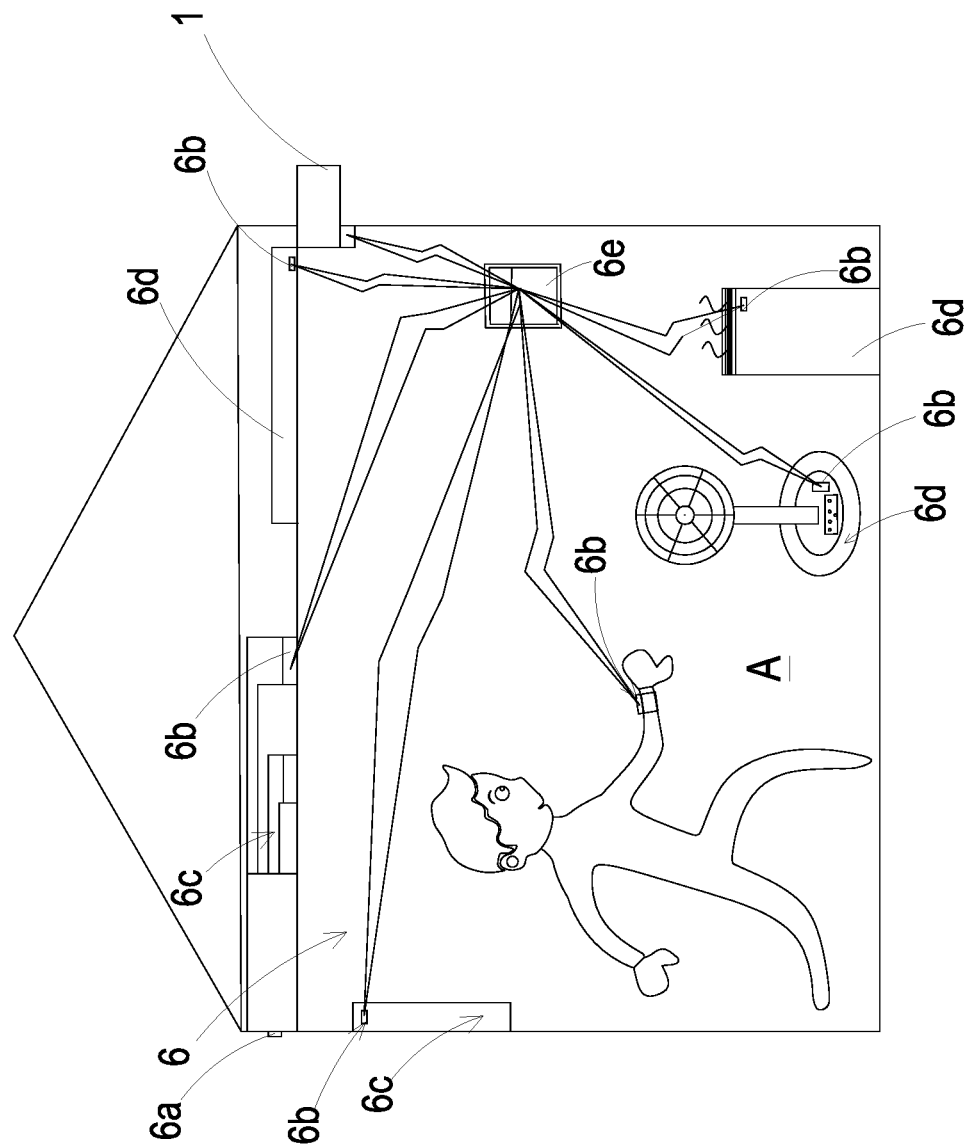
FIG. 2 is a schematic view illustrating a pollution processing system of the exhaust fan for preventing air pollution according to the embodiment of the present disclosure.
Figure 3:
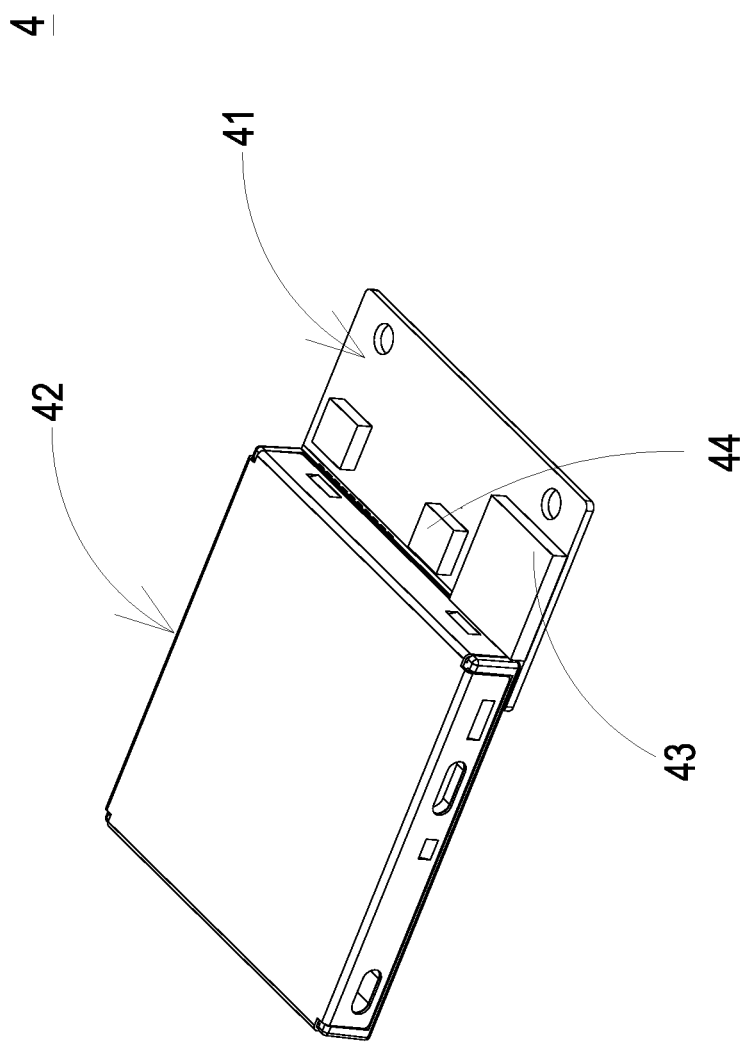
FIG. 3 is a schematic perspective view illustrating an assembled gas detection module of the exhaust fan for preventing air pollution according to an embodiment of the present disclosure.
Figure 4A:
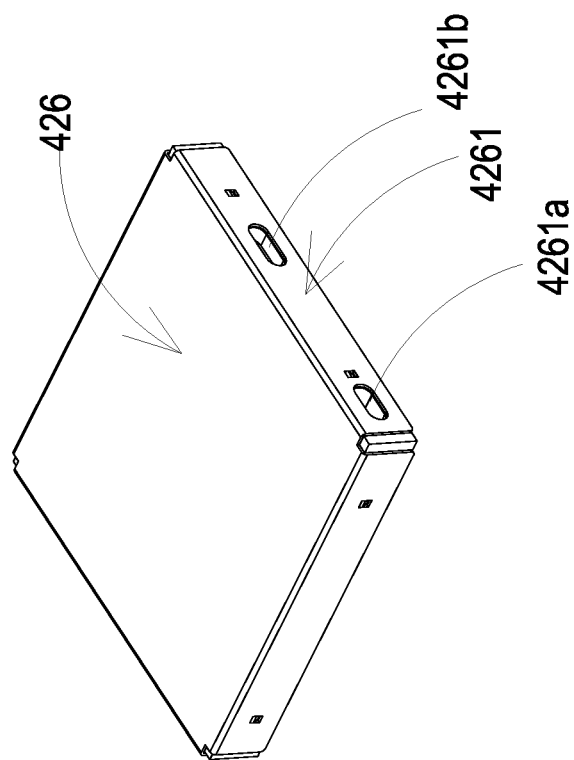
FIG. 4A is a schematic view illustrating an assembled gas detection main part of the gas detection module according to an embodiment of the present disclosure.
Figure 4B:
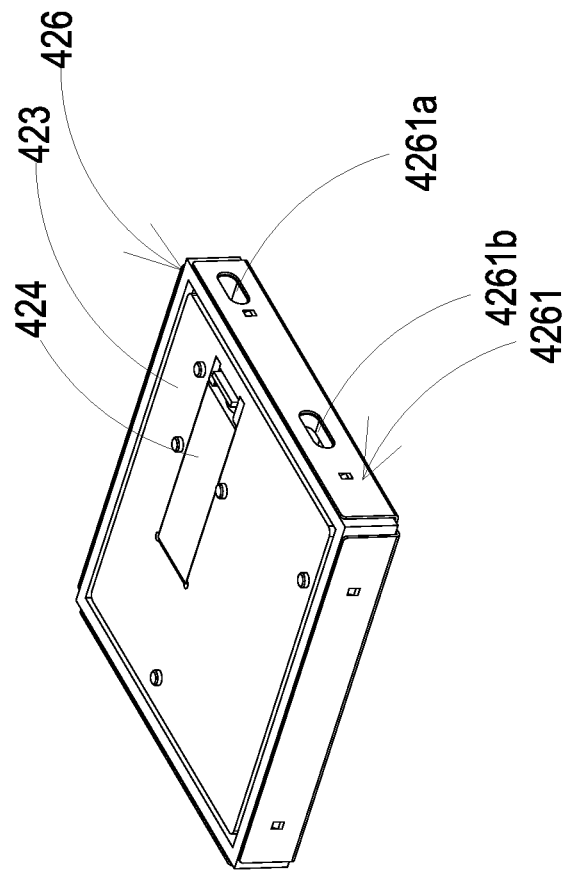
FIG. 4B is a schematic view illustrating the assembled gas detection main part of the gas detection module according to the embodiment of the present disclosure from another viewing angle.
Figure 4C:
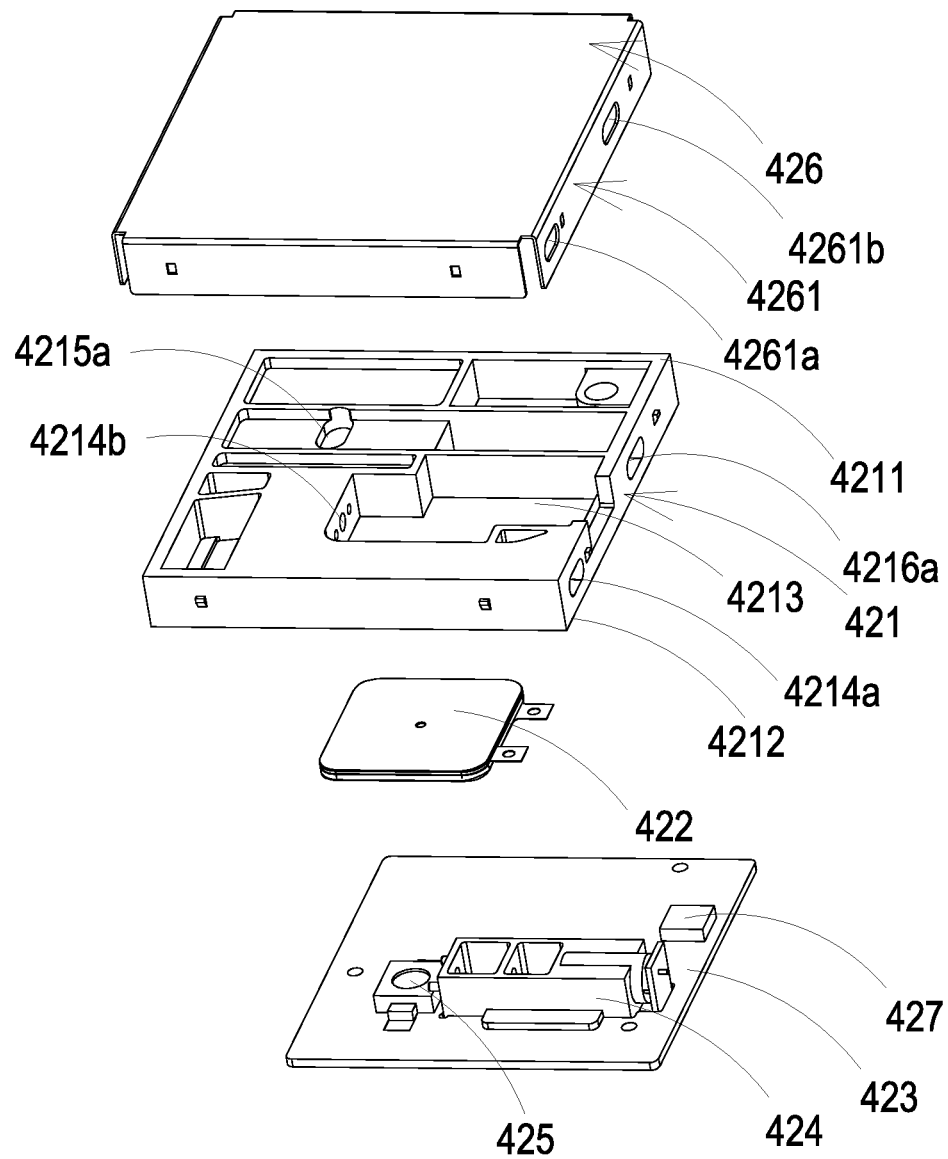
FIG. 4C is a schematic exploded view illustrating the gas detection main part of the gas detection module according to the embodiment of the present disclosure.
Figure 5A:
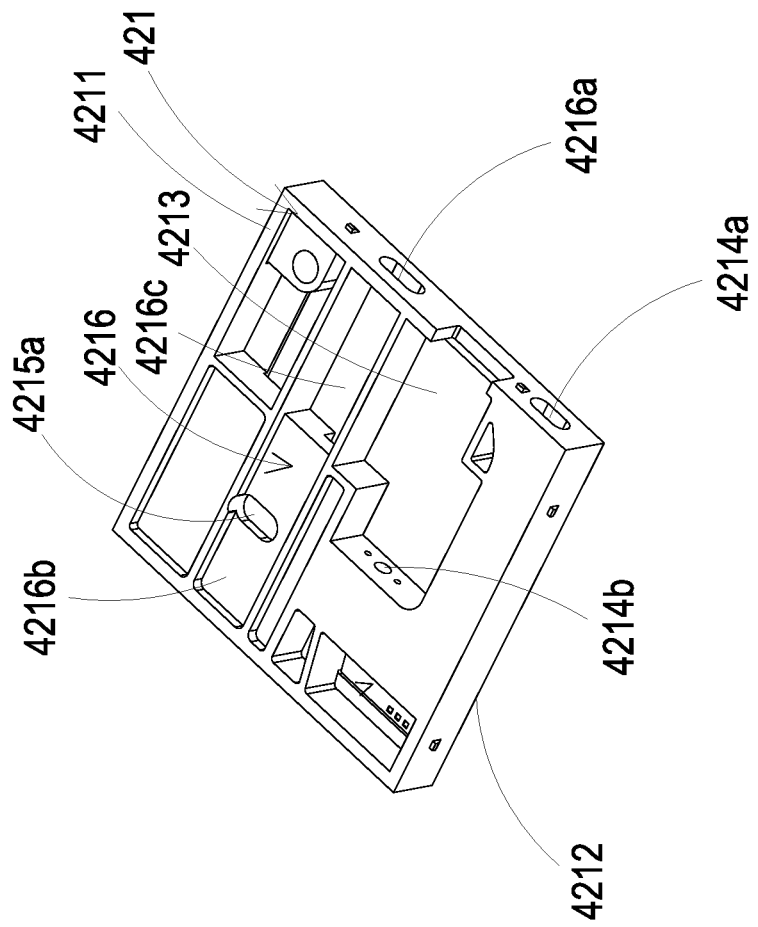
FIG. 5A is a schematic view illustrating a base of the gas detection main part in the gas detection module according to an embodiment of the present disclosure.
Figure 5B:
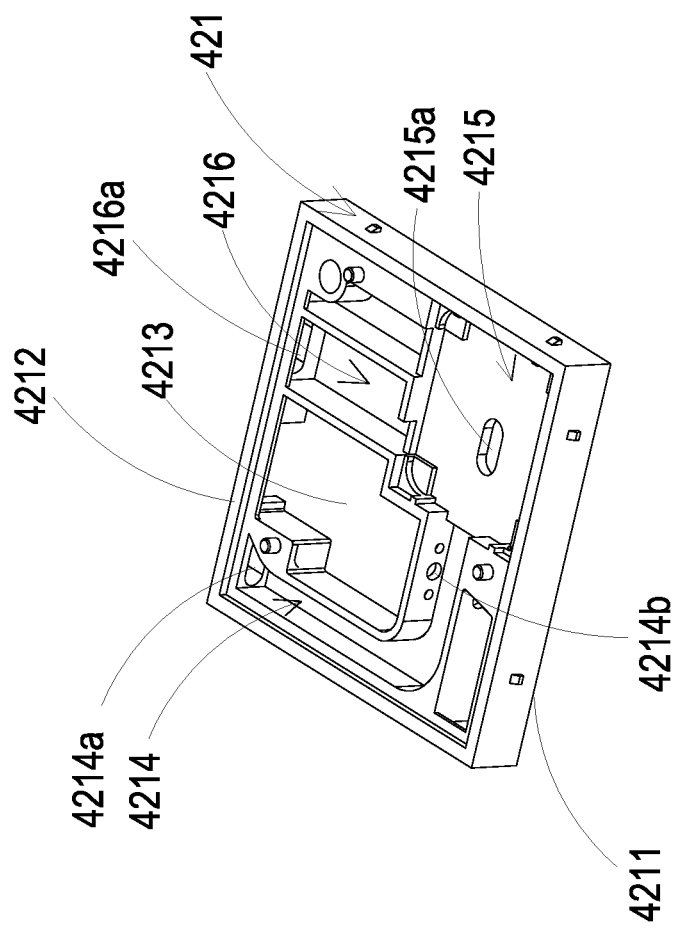
FIG. 5B is a schematic view illustrating the base of the gas detection main part in the gas detection module according to the embodiment of the present disclosure from another viewing angle.
Figure 6:
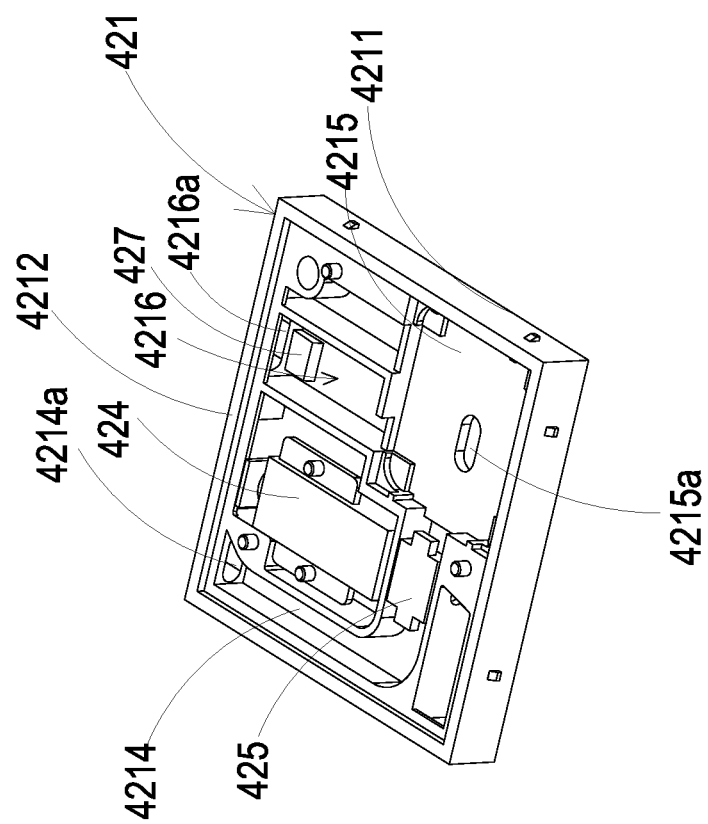
FIG. 6 is a schematic view illustrating a laser component received within the base of the gas detection main part of the gas detection module according to an embodiment of the present disclosure.
Figure 7A:
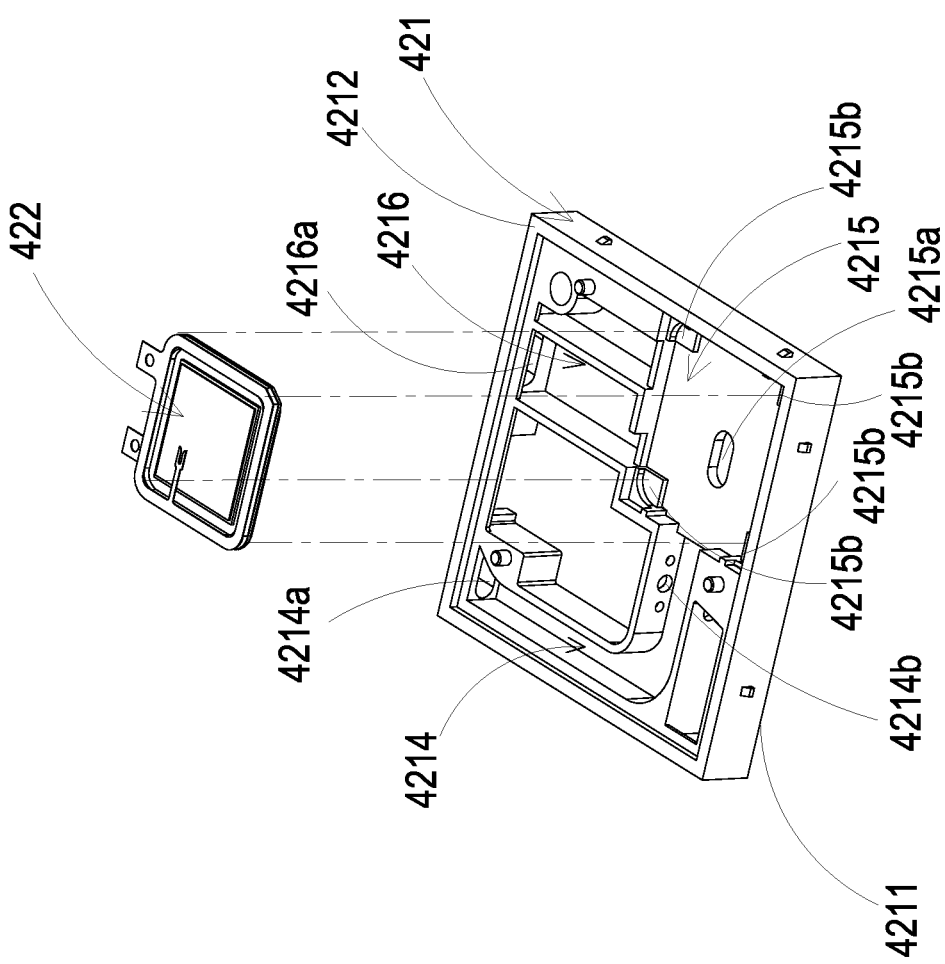
FIG. 7A is a schematic exploded view illustrating a piezoelectric actuator and the base of the gas detection main part of the gas detection module according to an embodiment of the present disclosure.
Figure 7B:
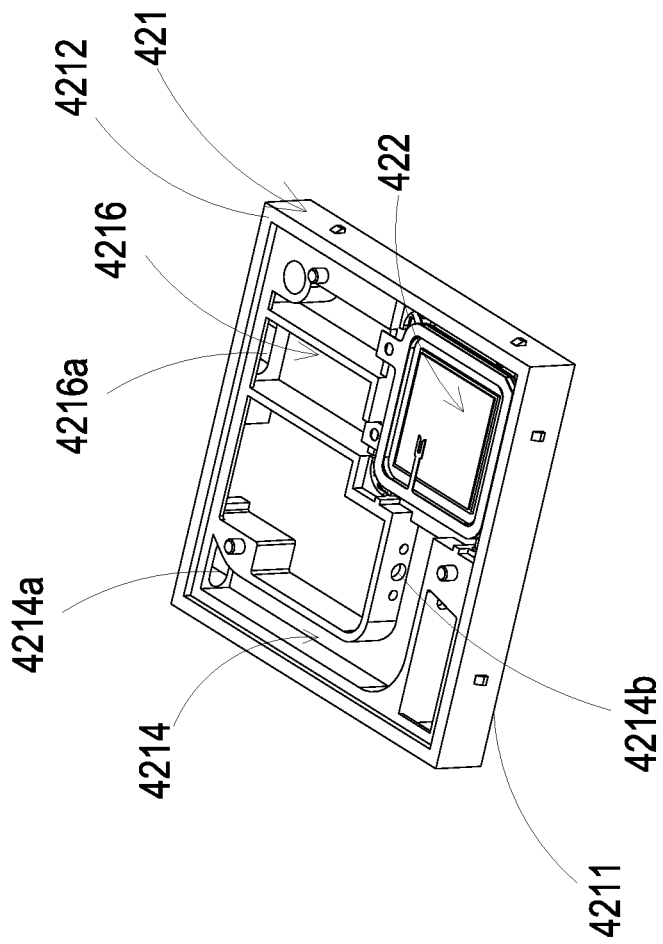
FIG. 7B is a schematic view illustrating the combination of the piezoelectric actuator and the base of the gas detection main part in the gas detection module according to the embodiment of the present disclosure.
Figure 8A:
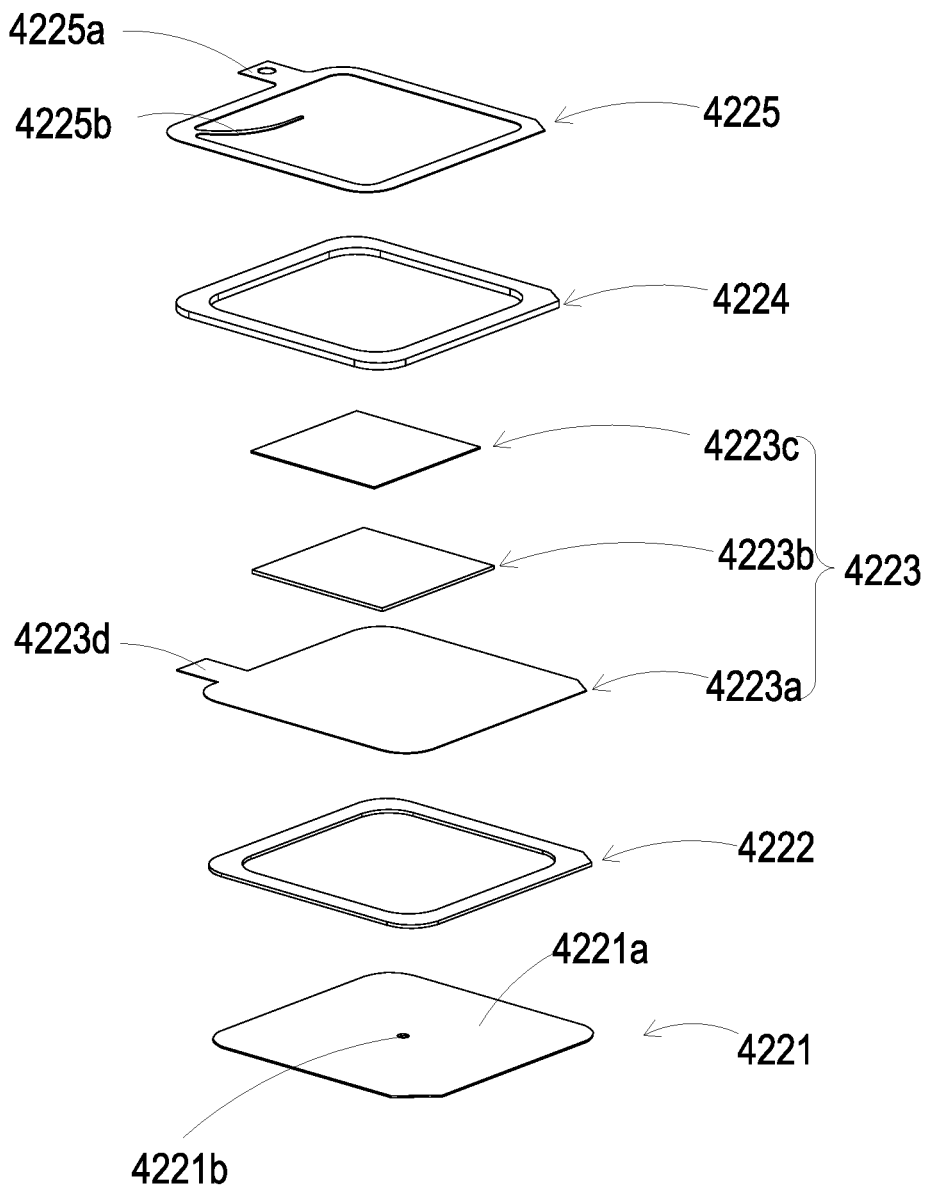
FIG. 8A is a schematic exploded view illustrating the piezoelectric actuator of the gas detection main part in the gas detection module according to an embodiment of the present disclosure.
Figure 8B:
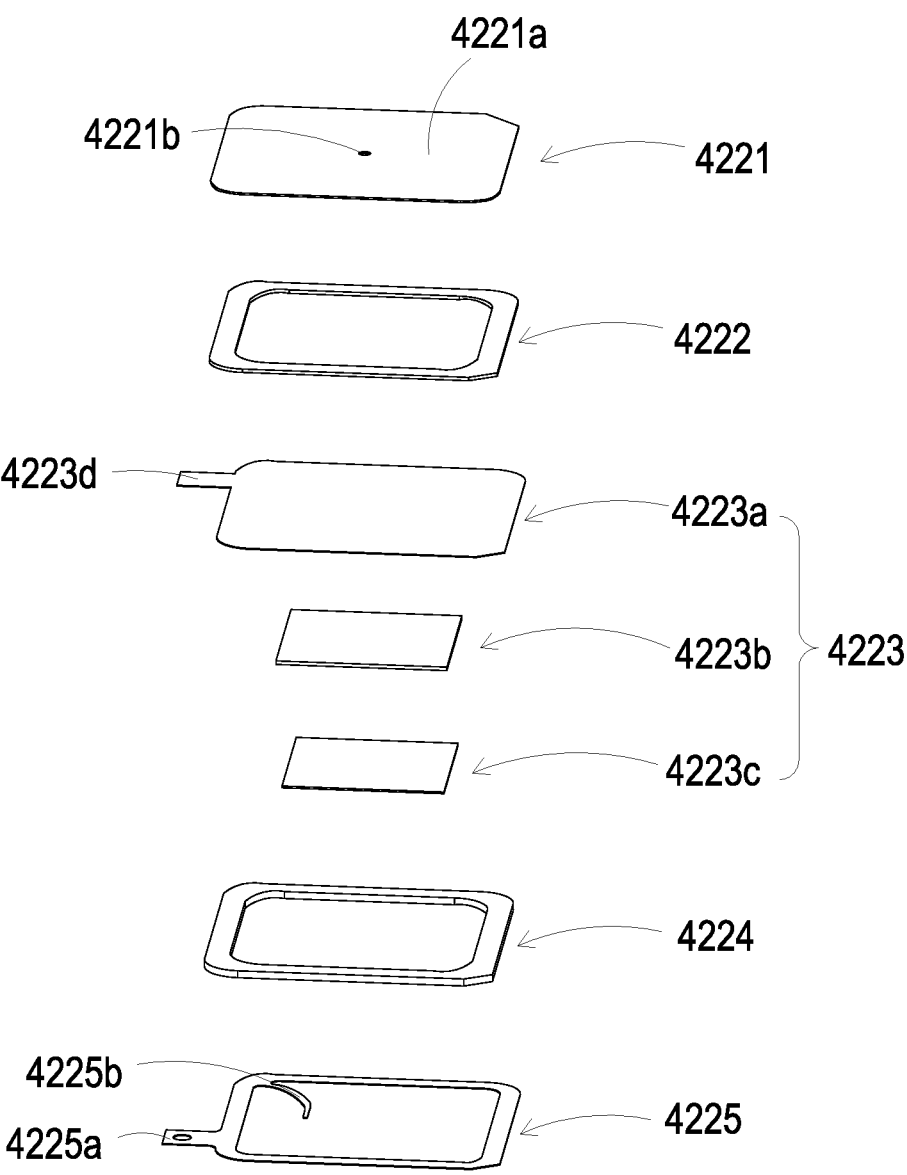
FIG. 8B is a schematic exploded view illustrating the piezoelectric actuator of the gas detection main part in the gas detection module according to the embodiment of the present disclosure from another viewing angle.

Please refer to FIG. 2. In some embodiments, the exhaust fan for preventing air pollution of the present disclosure is combined with a pollution processing system 6. The microcontroller 5 performs a bidirectional communication with the pollution processing system 6 through the wireless communication transmission, so as to transmit the gas detection data detected by the gas detection module 4 of the exhaust fan to the pollution processing system 6, and receive information transmitted from the pollution processing system 6, thereby issuing the driving instruction to control the enablement of the gas guider 2 and adjust the volume of guiding air-flow of the gas guider 2.

The pollution processing system 6 mentioned above includes at least one outdoor gas detection module 6a, at least one indoor gas detection module 6b, at least one gas-exchanging processing device 6c, at least one indoor purification and filtration device 6d and an intelligent control and processing device 6e.

In the embodiment, the at least one outdoor gas detection module 6a is disposed in an outdoor space B to detect the air pollution source in the outdoor space B and output outdoor gas detection data, and the at least one indoor gas detection module 6b is disposed in an indoor space A to detect the air pollution source in the indoor space A and output indoor gas detection data. Notably, the enablement of the gas guider 2 or the adjustment of the volume of guiding air-flow can be controlled manually through the microcontroller 5 directly. Alternatively, the volume of guiding air-flow of the gas guider 2 also can be intelligently and automatically adjusted by the pollution processing system 6 through issuing the driving instruction. The outdoor gas detection module 6a is disposed in the outdoor space B to detect the air quality in the outdoor space B and output the outdoor gas detection data, and the indoor gas detection module 6b is disposed in the indoor space A to detect the air quality in the indoor space A and output the indoor gas detection data. Preferably but not exclusively, the outdoor gas detection module 6a or the indoor gas detection module 6b includes a gas detection module 4 for detecting the air quality and outputting the gas detection data.

The at least one gas-exchanging processing device 6c is configured to control an introduction of an outdoor gas in the outdoor space B into the indoor space A, so as to assist in exchanging and filtering the air pollution source in the indoor space A. The at least one indoor purification and filtration device 6d is configured to filter and exchange the air pollution source in the indoor space A. The intelligent control and processing device 6e receives and compares the outdoor gas detection data and the indoor gas detection data, thereby intelligently selecting to control the introduction of the outdoor gas in the outdoor space B by the at least one gas-exchange processing device 6c.

In the embodiment, the intelligent control and processing device 6e receives and compares the outdoor gas detection data and the indoor gas detection data, thereby intelligently selecting to control the at least one gas-exchange processing device 6c to introduce or not introduce the outdoor gas in the outdoor space B. Moreover, the at least one intelligent control and processing device 6e controls the at least one indoor purification and filtration device 6d in real time to purify and filter the air pollution source in the indoor space A, so that the air pollution source in the indoor space A can be filtered and exchanged to generate a clean and fresh air. Notably, the at least one indoor purification and filtration device 6d is selected from the group consisting of an air conditioner, a range hood, an electric fan, a purifier, a vacuum cleaner, an air blower and a combination thereof. Each indoor purification and filtration device 6d is equipped with one indoor gas detection module 6b, which detects the air pollution source in the indoor space A and controls the enablement and operation of the indoor purification and filtration device 6d.

Therefore, after the intelligent control and processing device 6e receives and compares the outdoor gas detection data and the indoor gas detection data, and determines that the indoor gas detection data is worse than the outdoor gas detection data, the control signal is transmitted to the gas-exchange processing device 6c to introduce the outdoor gas into the indoor space A. Moreover, a controlling command is transmitted to enable the at least one indoor purification and filtration device 6d to perform the filtration and purification, but not limited thereto.

Alternatively, after receiving and comparing the outdoor gas detection data and the indoor gas detection data, the intelligent control and processing device 6e also can intelligently select to output the controlling command to enable the at least one indoor purification and filtration device 6d, or intelligently select to output the controlling command for enabling the microcontroller 5 of the exhaust fan, so that the microcontroller 5 outputs a driving instruction to control the enablement of the gas guider 2 and adjust the volume of guiding air-flow of the gas guider 2. Therefore, the air pollution source in the indoor space A can be filtered and exchanged to generate a clean and fresh air.

Please refer to FIG. 2. In the embodiment, at least three indoor gas detection modules 6b are utilized. The intelligent control and processing device 6e receives and compares the indoor gas detection data outputted by the at least three indoor gas detection modules 6b under an intelligent computation for locating the position of the air pollution source in the indoor space A, and intelligently selects to enable the gas-exchanging processing device 6c or the indoor purification and filtration device 6d adjacent to the air pollution source, so as to accelerate the guiding of the air pollution source, thereby preventing the air pollution source from diffusion. Alternatively, the intelligent control and processing device 6e receives and compares the indoor gas detection data outputted by the at least three indoor gas detection modules 6b under the intelligent computation for locating the position of the air pollution source in the indoor space A, and intelligently selects to enable the gas-exchanging processing device 6c or the indoor purification and filtration device 6d adjacent to the air pollution source preferentially to inhale the air pollution source, and at the same time, the intelligent control and processing device 6e also intelligently selects to enable the rest of the indoor purification and filtration devices 6d under the intelligent computation to generate an airflow to guide the air pollution source toward the indoor purification and filtration device 6d adjacent to the air pollution source for being filtered rapidly.

In summary, the present disclosure provides an exhaust fan for preventing air pollution capable of detecting the indoor air quality through the gas detection module for revealing the status of air quality in the environment in real time, and also guiding the air pollution source through the gas guider toward the filtration and purification component for being filtered in real time. Moreover, the microcontroller is utilized to receive the gas detection data detected by the gas detection module to control the enablement of the gas guider and the adjustment of the volume of guiding air-flow. Accordingly, the air quality in the environment can be detected and the air pollution source can be filtered and processed in real time. Furthermore, the exhaust fan for preventing air pollution of the present disclosure not only can detect the air quality in the environment automatically, but also can construct a complete real-time air processing system as in combined with the cloud computing system and/or the indoor pollution processing system.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An exhaust fan for preventing air pollution, comprising:
a main body configured to form an airflow-guiding path and having a gas guider and a filtration and purification component disposed in the airflow-guiding path, wherein the gas guider introduces an air convection for guiding an air pollution source contained in an air to pass through the filtration and purification component so as to filter and purify the air pollution source;
at least one gas detection module disposed in the airflow-guiding path of the main body for detecting the air pollution source and transmitting gas detection data; and
a microcontroller for receiving the gas detection data from the at least one gas detection module through a wireless communication transmission, and intelligently comparing the gas detection data under a surveillance status, so as to output a driving instruction to control an enablement of the gas guider and adjust a volume of guiding air-flow of the gas guider,
wherein the air pollution source is continuously monitored in the surveillance status to ensure the gas detection data does not exceed a safety detection value.

2. The exhaust fan for preventing air pollution as claimed in claim 1, wherein the surveillance status is referring to that the air pollution source is continuously monitored to make sure that the gas detection data does not exceed a safety detection value.

3. The exhaust fan for preventing air pollution as claimed in claim 2, wherein the safety detection value is at least one selected from the group consisting of less than 35 µg/m$^3$ of the value of $PM_{2.5}$, less than 1000 ppm of the carbon dioxide content, less than 0.56 ppm of the total volatile organic compounds content, less than 0.08 ppm of the formaldehyde content, less than 1500 CFU/m$^3$ of the amount of bacteria, less than 1000 CFU/m$^3$ of the amount of fungi, less than 0.075 ppm of the sulfur dioxide content, less than 0.1 ppm of the nitrogen dioxide content, less than 9 ppm of the carbon monoxide content, less than 0.06 ppm of the ozone content, less than 0.15 µg/m$^3$ of the value of lead and a combination thereof.

4. The exhaust fan for preventing air pollution as claimed in claim 1 wherein the at least one gas detection module comprises a control circuit board, a gas detection main part, a microprocessor and a communicator, and the gas detection main part, the microprocessor and the communicator are integrally packaged on the control circuit board and electrically connected to the control circuit board, and wherein the microprocessor controls a detection operation of the gas detection main part, the gas detection main part detects the air pollution source and outputs a detection signal, and the microprocessor receives, computes and processes the detection signal for generating the gas detection data so as to provide to the communicator for an external wireless communication transmission.

5. The exhaust fan for preventing air pollution as claimed in claim 1, wherein the at least one gas detection module comprises a control circuit board, a gas detection main part, a microprocessor and a communicator, and the gas detection main part, the microprocessor and the communicator are integrally packaged on the control circuit board and electrically connected to the control circuit board, and wherein the microprocessor controls a detection operation of the gas detection main part, the gas detection main part detects the air pollution source and outputs a detection signal, and the microprocessor receives, computes and processes the detection signal for generating the gas detection data so as to provide to the communicator for an external wireless communication transmission.

6. The exhaust fan for preventing air pollution as claimed in claim 5, wherein the microcontroller receives the gas detection data transmitted by the communicator through a wireless communication transmission.

7. The exhaust fan for preventing air pollution as claimed in claim 4, wherein the gas detection main part comprises:
a base comprising:
a first surface;
a second surface opposite to the first surface;
a laser loading region hollowed out from the first surface to the second surface;
a gas-inlet groove concavely formed from the second surface and disposed adjacent to the laser loading region, wherein the gas-inlet groove comprises a gas-inlet, two lateral walls and a transparent window respectively opened on each of the lateral walls for being in communication with the laser loading region;
a gas-guiding-component loading region, concavely formed from the second surface, in communication with the gas-inlet groove and having a ventilation hole penetrated a bottom surface thereof; and
a gas-outlet groove concavely formed from a region of the first surface, spatially corresponding to the bottom surface of the gas-guiding-component loading region, and hollowed out from the first surface to the second surface in a region where the first surface is misaligned with the gas-guiding-component loading region, wherein the gas-outlet groove is in communication with the ventilation hole and comprises a gas-outlet mounted thereon;
a piezoelectric actuator accommodated in the gas-guiding-component loading region;
a driving circuit board attaching to and covering the second surface of the base;
a laser component positioned and disposed on the driving circuit board and electrically connected to the driving circuit board, and accommodated in the laser loading region, wherein a light beam emitted from the laser component passes through the transparent window and extends in an orthogonal direction perpendicular to the gas-inlet groove;
a particulate sensor positioned and disposed on the driving circuit board and electrically connected to the driving circuit board, and accommodated in the gas-inlet groove at a region in an orthogonal direction perpendicular to a path of the light beam from the laser component, for detecting suspended particulates contained in the air pollution source passing through the gas-inlet groove and irradiated by the light beam emitted from the laser component;
a gas sensor positioned and disposed on the driving circuit board and electrically connected to the driving circuit board, and accommodated in the gas-outlet groove for detecting the air pollution source guided into the gas-outlet groove; and
an outer cover covering the base and comprising a side plate, wherein the side plate comprises an inlet opening and an outlet opening, and wherein the inlet opening is spatially corresponding to the gas-inlet of the base and the outlet opening is spatially corresponding to the gas-outlet of the base,
wherein the first surface of the base is covered by the outer cover, and the second surface of the base is covered by the driving circuit board, so that an inlet path is defined by the gas-inlet groove and an outlet path is defined by the gas-outlet groove, thereby the piezoelectric actuator introduces the air pollution source outside the gas-inlet of the base into the inlet path defined by the gas-inlet groove through the inlet opening, the particulate sensor detects a concentration of the suspended particulates contained in the air pollution source, and the air pollution source enters the outlet path defined by the gas-outlet groove through the ventilation hole is detected by the gas sensor and discharged through the gas-outlet of the base and the outlet opening.

8. The exhaust fan for preventing air pollution as claimed in claim 7, wherein the particulate sensor detects information of suspended particles.

9. The exhaust fan for preventing air pollution as claimed in claim 7, wherein the gas sensor is selected from the group consisting of a volatile-organic-compound sensor, a formaldehyde sensor, a bacteria sensor, a virus sensor and a combination thereof, and wherein the volatile-organic-compound sensor detects information of carbon dioxide or total volatile organic compounds in the gas, the formaldehyde sensor detects information of formaldehyde in the gas, the bacteria sensor detects information of bacteria or fungi in the gas, and the virus sensor detects information of viruses in the gas.

10. The exhaust fan for preventing air pollution as claimed in claim 7, wherein the gas sensor comprises a temperature and humidity sensor for detecting information of temperature and humidity of the gas.

11. The exhaust fan for preventing air pollution as claimed in claim 1, wherein the microcontroller performs a bidirectional communication with a cloud computing system through the wireless communication transmission, and wherein the microcontroller transmits the gas detection data detected by the at least one gas detection module of the exhaust fan to the cloud computing system and receives information transmitted from the cloud computing system, thereby issuing the driving instruction to control the enablement of the gas guider and adjust the volume of guiding air-flow of the gas guider.

12. The exhaust fan for preventing air pollution as claimed in claim 1, wherein the microcontroller performs a bidirectional communication with a pollution processing system through the wireless communication transmission, and wherein the microcontroller transmits the gas detection data detected by the at least one gas detection module of the exhaust fan to the pollution processing system and receives information transmitted from the pollution processing system, thereby issuing the driving instruction to control the enablement of the gas guider and adjust the volume of guiding air-flow of the gas guider.

13. The exhaust fan for preventing air pollution as claimed in claim 12, wherein the pollution processing system comprises at least one outdoor gas detection module, at least one indoor gas detection module, at least one gas-exchanging processing device, at least one indoor purification and filtration device, and an intelligent control and processing device, and the intelligent control and processing device receives and compares outdoor gas detection data and indoor gas detection data respectively detected by the at least one outdoor gas detection module in an outdoor space and the at least one indoor gas detection module in an indoor space and selects to output a controlling command for enabling the microcontroller of the exhaust fan, whereby the microcontroller issues the driving instruction for controlling the enablement of the gas guider and adjusting the volume of guiding air-flow of the gas guider, so that the air pollution source in the indoor space is filtered and exchanged to generate another clean air.

14. The exhaust fan for preventing air pollution as claimed in claim 1, wherein the filtration and purification component is one selected from the group consisting of an activated carbon filter screen, a high efficiency particulate air filter screen, a zeolite filter screen and a combination thereof.

15. The exhaust fan for preventing air pollution as claimed in claim 1, wherein the filtration and purification component is coated with one selected from the group consisting of a layer of a cleansing factor containing chlorine dioxide, an herbal protective layer extracted from ginkgo and Japanese *Rhus chinensis*, a layer of sliver ions and a combination thereof, and wherein the cleansing factor containing chlorine dioxide inhibits viruses and bacteria contained in the air pollution source, the herbal protective layer extracted from ginkgo and Japanese *Rhus chinensis* forms an herbal protective anti-allergic filter to resist allergy effectively and destroy a surface protein of influenza virus, and the sliver ions inhibit viruses and bacteria contained in the air pollution source.

16. The exhaust fan for preventing air pollution as claimed in claim 1, wherein the filtration and purification component comprises at least one selected from the group consisting of an activated carbon filter screen, a high efficiency particulate air (HEPA) filter screen, a zeolite filter screen, a photo-catalyst unit, a photo-plasma unit, a negative ionizer, a plasma ion unit and a combination thereof.

* * * * *